July 23, 1946.    A. G. BELDEN ET AL    2,404,613
CRANKSHAFT GRINDING MACHINE
Filed March 2, 1944    5 Sheets-Sheet 5
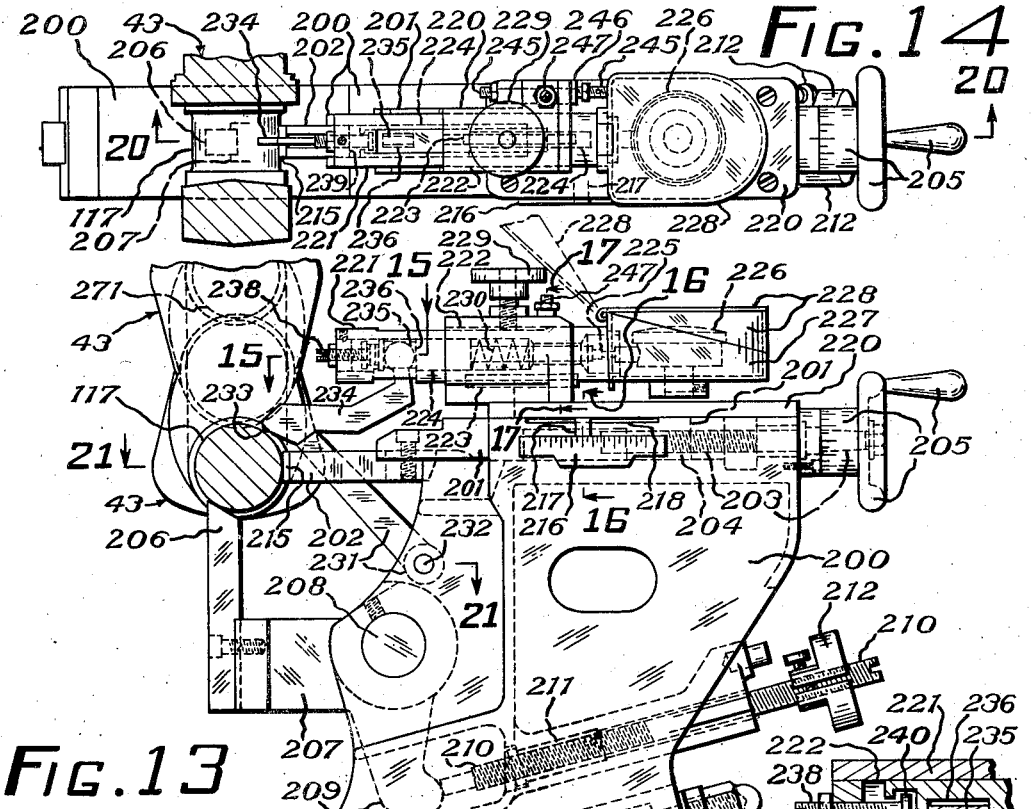
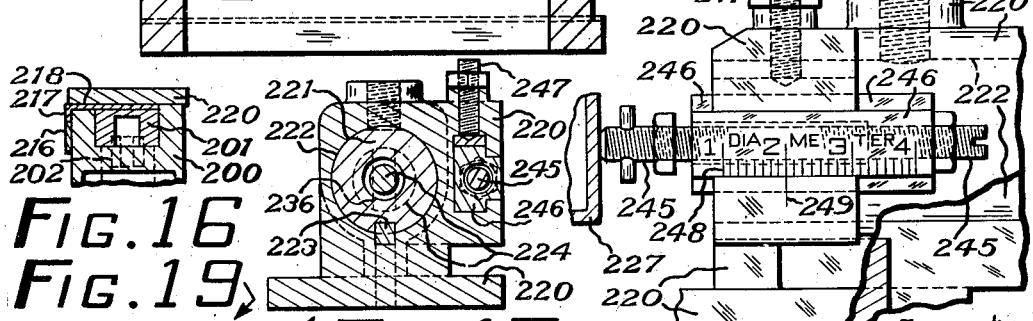
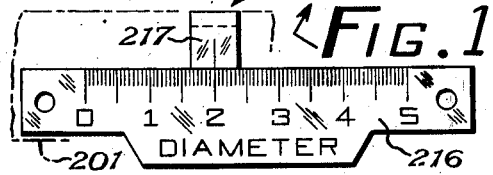
Inventors
ALBERT G. BELDEN
CARL G. FLYGARE
OIVA E. HILL
By Harold W. Eaton
Attorney Patented July 23, 1946

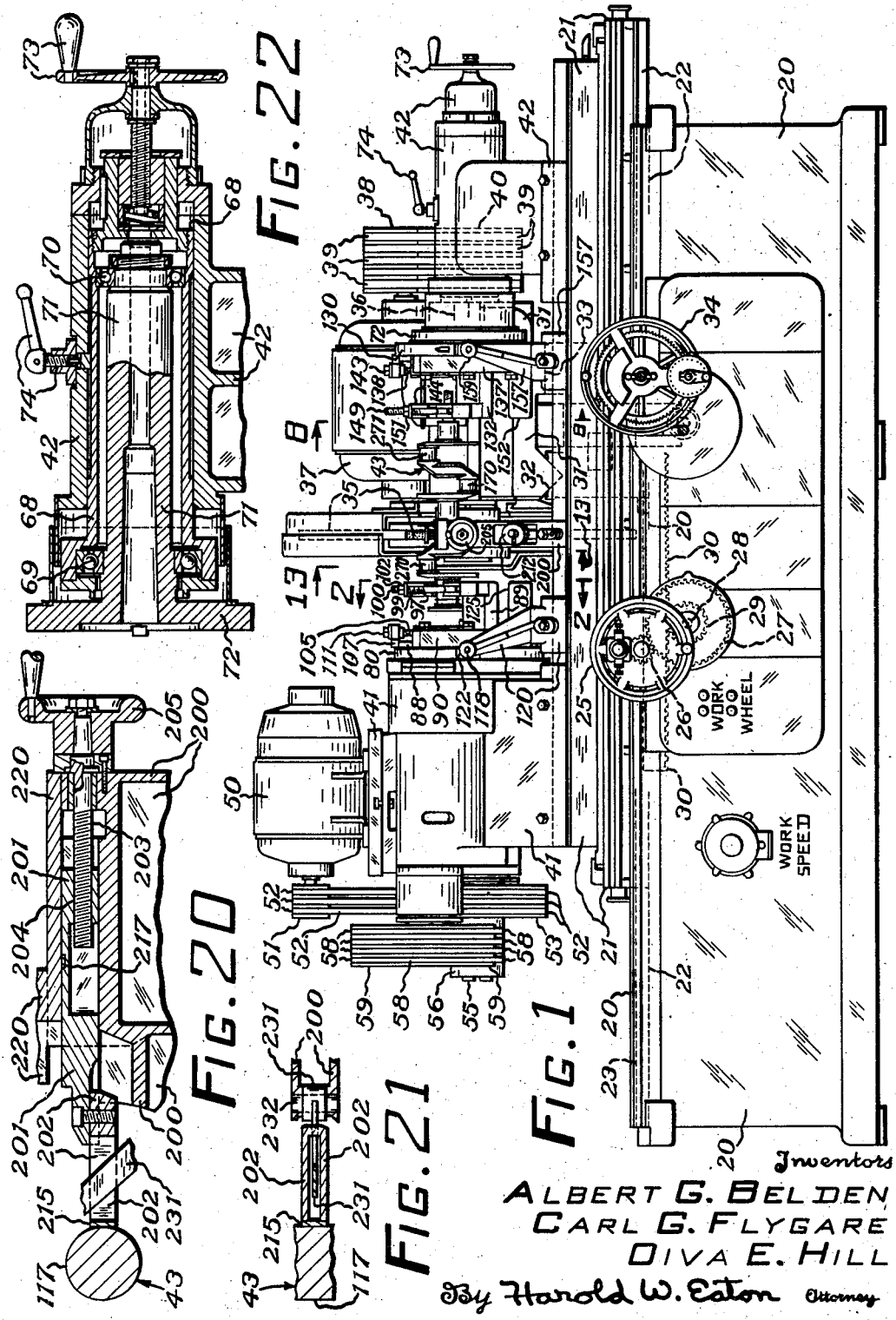

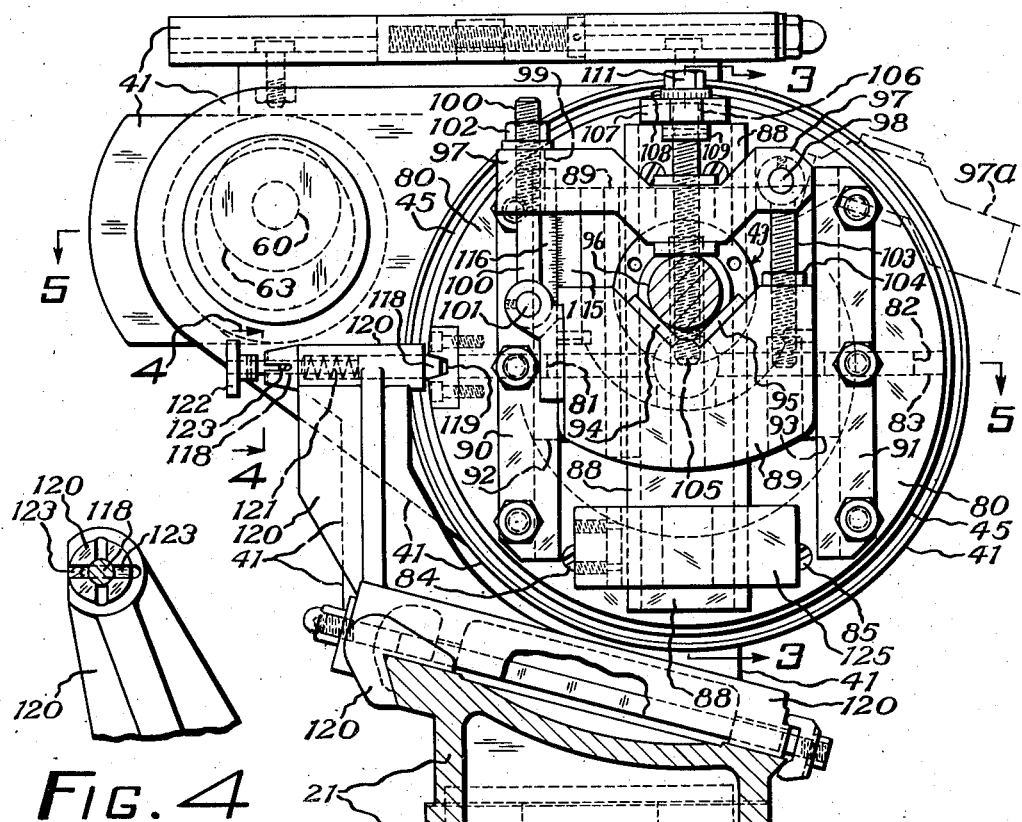
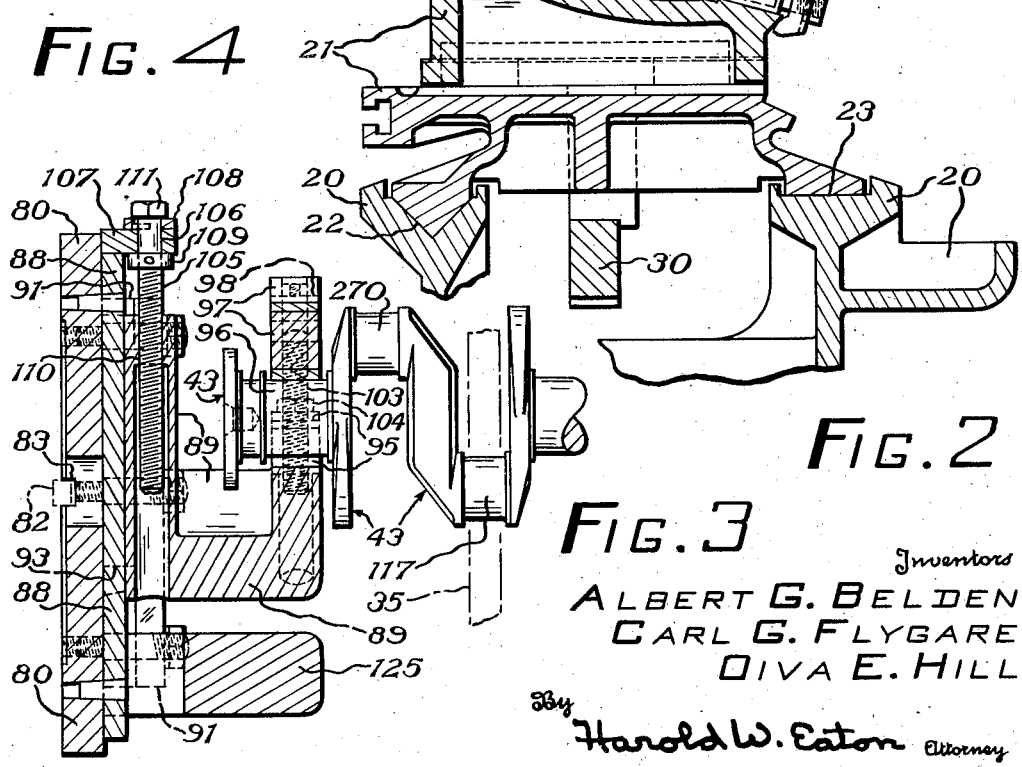

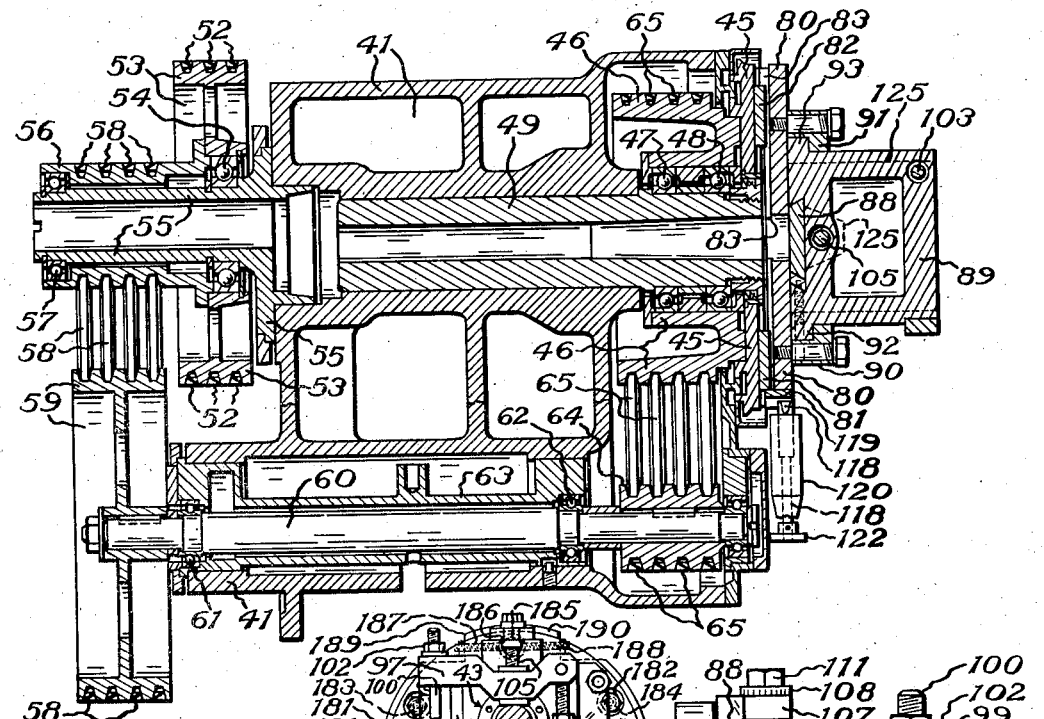
FIG. 5
FIG. 23
FIG. 6
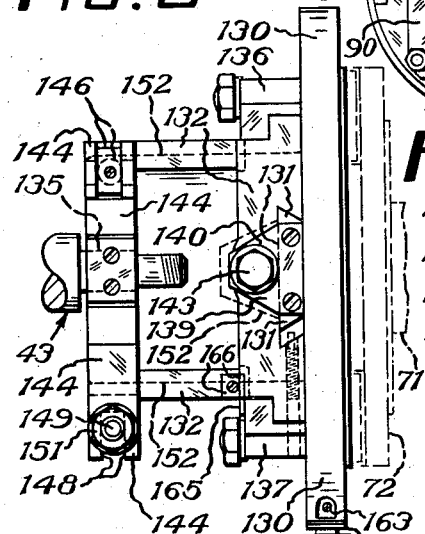
FIG. 7
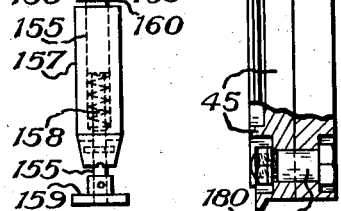
FIG. 24
Inventors
ALBERT G. BELDEN
CARL G. FLYGARE
OIVA E. HILL
By Harold W. Eaton Attorney

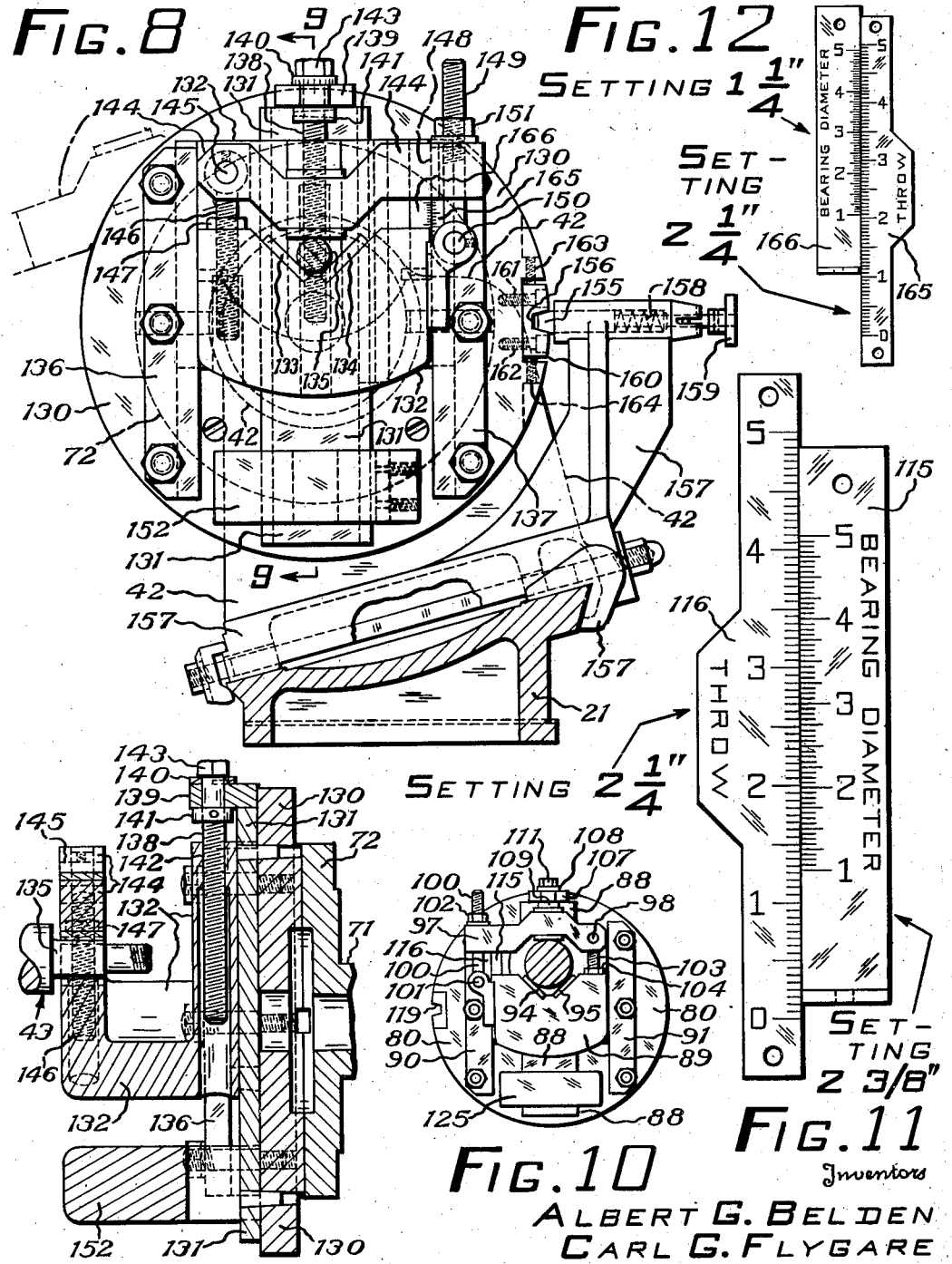

2,404,613

UNITED STATES PATENT OFFICE 2,404,613

CRANKSHAFT GRINDING MACHINE

Albert G. Belden, Carl G. Flygare, and Oiva E. Hill, Worcester, Mass., assignors to Norton Company, Worcester, Mass., a corporation of Massachusetts Application March 2, 1944, Serial No. 524,736

14 Claims. (Cl. 51—72)

This invention relates to grinding machines, and more particularly to a crankshaft grinding and regrinding machine for grinding or regrinding the crankpins and main bearings of a crankshaft.

One object of the invention is to provide a simple and thoroughly practical crankshaft grinding machine. Another object of the invention is to provide a crank grinding machine in which a crankshaft may be readily positioned in the machine for grinding or regrinding the crankpins and bearings thereon.

Another object of this invention is to provide adjustably positioned pot chucks for supporting the opposite ends of a crankshaft in which the pot chucks are provided with a diametric adjustment whereby the crankshaft to be ground may be readily positioned for grinding crankpins of a predetermined diameter and throw. Another object of the invention is to provide an adjustably mounted pot chuck for supporting a crankshaft for a grinding operation, in which the pot chuck is adjustable along a diametric line relative to its axis of rotation and to provide the pot chuck with precision means whereby the pot chuck may be readily adjusted to position the chuck for supporting a bearing of a known diameter so that the crankpin or main bearing to be ground may be positioned concentric with the axis of rotation of the chuck so as to grind the crankpin to the desired diameter and throw.

A further object of the invention is to provide a pot chuck having a diametric adjustment whereby the pot chuck may be adjusted relative to the axis of rotation of the chuck to facilitate grinding crankpins of desired throws and in which the chuck is also provided with a lateral or transverse adjustment substantially normal to the diametric adjustment to facilitate positioning the pot chuck for supporting a crankshaft with its axis coinciding with the axis of rotation of the pot chuck for grinding the main bearings of the crankshaft.

Another object of the invention is to provide a pot chuck having a clamping strap to hold the work piece in position in which the fulcrum point for the clamping strap is adjustably supported. Another object of the invention is to provide a clamping strap having an adjustable pivot point with means for inverting the position of the strap so as to accommodate either relatively large or relatively small diameter work pieces in the pot chuck.

A further object of the invention is to provide an improved steadyrest which also serves as a crankpin indexing or positioning mechanism. A further object of the invention is to provide a steadyrest with a graduated scale whereby the horizontally movable steadyrest shoe may be precisely positioned for locating a crankpin of a known diameter in position before the shaft is clamped in the supporting pot chucks.

Another object of the invention is to provide the steadyrest with a visible indicating mechanism whereby the concentricity of the crankpin relative to the axis of rotation of the supporting pot chucks may be readily determined. A further object of the invention is to provide such a gauging apparatus on the steadyrest whereby visible indication may be had of the crankpin as it is ground or reground to indicate the diameter thereof. Other objects will be in part obvious or in part pointed out hereinafter.

The invention accordingly consists in the features of construction, combinations of elements, and arrangements of parts, as will be exemplified in the structure to be hereinafter described, and the scope of the application of which will be indicated in the following claims.

In the accompanying drawings in which is shown one of various possible embodiments of the mechanical features of this invention, Fig. 1 is a front elevation of an improved crankshaft grinding machine embodying this invention;

Fig. 2 is a fragmentary cross section, on an enlarged scale, taken approximately on the line 2—2 of Fig. 1, showing the headstock pot chuck in elevation;

Fig. 3 is a fragmentary vertical sectional view, taken approximately on the line 3—3 of Fig. 2, through the headstock pot chuck;

Fig. 4 is a fragmentary sectional view, on an enlarged scale, taken approximately on the line 4—4 of Fig. 2, through the pot chuck locating plunger;

Fig. 5 is a horizontal sectional view, on a reduced scale, taken approximately on the line 5—5 of Fig. 2, showing the drive for the headstock pot chuck;

Fig. 6 is a fragmentary elevation of the headstock pot chuck, as shown in Fig. 3;

Fig. 7 is a fragmentary plan view of the footstock pot chuck;

Fig. 8 is a fragmentary vertical sectional view, on an enlarged scale, taken approximately on the line 8—8 of Fig. 1, showing the footstock pot chuck in elevation;

Fig. 9 is a fragmentary vertical sectional view, taken approximately on the line 9—9 of Fig. 8 through the footstock pot chuck;

Fig. 10 is a fragmentary elevation of the headstock pot chuck, on a reduced scale, showing the clamping strap in inverted position for clamping relatively large diameter shafts;

Fig. 11 is an enlarged view of the calibrated scales on the headstock pot chuck, showing the setting of the scales for positioning the headstock pot chuck;

Fig. 12 is a similar enlarged view, on a reduced scale, of the calibrated scales on the footstock pot chuck, showing the setting of the scales for positioning the footstock pot chuck;

Fig. 13 is a fragmentary cross sectional view, on an enlarged scale, taken approximately on the line 13—13 of Fig. 1, showing the combined steadyrest and crankpin aligning and gauging mechanism in end elevation;

Fig. 14 is a plan of the combined steadyrest and crankpin aligning and gauging mechanism;

Fig. 15 is a fragmentary horizontal sectional view, on an enlarged scale, taken approximately on the line 15—15 of Fig. 13;

Fig. 16 is a fragmentary cross sectional view, taken approximately on the line 16—16 of Fig. 13;

Fig. 17 is a cross sectional view, on an enlarged scale, taken approximately on the line 17—17 of Fig. 13;

Fig. 18 is a fragmentary side elevation, on an enlarged scale, showing the stop screw and scale;

Fig. 19 is a fragmentary elevation, on an enlarged scale, showing the scale calibrated in inches of crank diameter for positioning and aligning the crankpins;

Fig. 20 is a fragmentary vertical sectional view, on a reduced scale, taken approximately on the line 20—20 of Fig. 14;

Fig. 21 is a fragmentary sectional view, taken approximately on the line 21—21 of Fig. 13;

Fig. 22 is a vertical sectional view, on an enlarged scale, through the footstock;

Fig. 23 is an end elevation of a modified pot chuck, on a reduced scale, showing an adjustment for the pot chuck; and Fig. 24 is a front elevation, on an enlarged scale, of the pot chuck shown in Fig. 23.

The improved crankshaft grinding machine has been illustrated in the drawings comprising a base 20 which supports a longitudinally movable work supporting table 21 which is arranged to slide longitudinally relative to the base 20 on a V-way 22 and a flat way 23 (Fig. 2). The table 21 may be moved longitudinally by means of a manually operable hand traverse mechanism which is substantially the same as that shown in the expired U. S. patent to C. H. Norton, No. 1,299,765 dated April 8, 1919. This traverse mechanism may comprise a hand wheel 25 which is operatively connected to rotate a small gear 26. The small gear 26 meshes with a larger gear 27 which is supported on a shaft 28. The shaft 28 also supports a gear 29 which meshes with a rack bar 30 depending from the under side of the table 21. It will be readily apparent from the foregoing disclosure that the table 21 may be readily traversed and positioned longitudinally by manual rotation of the traverse wheel 25. The direction of rotation of the hand wheel 25 determines the direction of movement of the table 21.

A transversely movable grinding wheel slide 31 is arranged to slide transversely relative to the base 20 of a V-way 32 and a flat way 33. The usual and well known nut and screw feed mechanism is provided for adjusting the wheel slide transversely relative to the base comprising a manually operable feed wheel 34 mounted on the front of the machine base. This type of feeding mechanism is old and well known in the art and is substantially the same as that shown in the expired patent to C. H. Norton No. 762,838 dated June 14, 1904, and consequently has not been illustrated and described in detail. For details of disclosure not contained herein, reference may be had to the above mentioned expired patent. The wheel slide 31 serves as a support for a rotatable grinding wheel 35 which is mounted on the left-hand end of a rotatable wheel spindle 36 which is journalled in suitable bearings (not shown) within the wheel slide 31. The grinding wheel 35 is preferably driven by an electric motor 37 mounted on the upper surface of the grinding wheel slide 31. The motor 37 is provided with a multi-V-groove pulley 38 which is connected by multiple V-belts 39 with a multi-V-groove pulley 40 mounted on the right-hand end of the wheel spindle 36.

The work supporting table 21 serves as a support for a headstock 41 and a footstock 42 which are arranged rotatably to support a crankshaft 43 for a predetermined grinding operation.

The headstock 41 is preferably a motor driven headstock in which a face plate 45 is fixedly mounted relative to a multi-V-groove pulley 46 which is journalled by suitable anti-friction bearings 47 and 48 adjacent to the right-hand end of a non-rotatable headstock spindle 49 (Figs. 1 and 5). An electric motor 50 is mounted on the upper surface of the headstock 41. The motor 50 is provided with a multi-V-groove pulley 51 which is connected by multiple V-belts 52 with a multi-V-groove pulley 53. The pulley 53 is supported by an anti-friction bearing 54 which is in turn supported on an eccentrically mounted adjustable sleeve 55 projecting from the left-hand of the headstock 41 (Fig. 5). A multi-V-groove pulley 56 is fixedly mounted relative to the pulley 53 and is journalled at its left-hand end by an anti-friction bearing 57. The anti-friction bearing 57 is supported on the left-hand end of the sleeve 55. The pulley 56 is connected by multiple V-belts 58 with a multi-V-groove pulley 59 which is keyed to the left-hand end of a rotatable shaft 60. The shaft 60 is journalled in anti-friction bearings 61 and 62 which are in turn supported in an adjustably mounted eccentric sleeve 63 in the headstock frame. A multi-V-groove pulley 64 is keyed to the right-hand end of the shaft 60 and is connected by multiple V-belts 65 to the multi-V-groove pulley 46 which carries the face plate 45. The face plate 45 serves as a support for an adjustably mounted work supporting pot chuck to be hereinafter described.

The footstock 42 (Fig. 22) is provided with a slidably mounted sleeve 68 which serves as a support for anti-friction bearings 69 and 70. The anti-friction bearings 69 and 70 serve as a support for a rotatable spindle 71 having formed integrally therewith a flange 72 which supports an adjustably mounted pot chuck for supporting the right-hand end of the crankshaft 43 to be ground. A manually operable hand wheel 73 is provided for adjusting the position of the sleeve 68 to position the pot chuck to be hereinafter described relative to the right-hand end of the crankshaft which is to be supported thereby. A binder screw 74 is provided to clamp the footstock sleeve 68 in adjusted position.

The headstock pot chuck (Figs. 2, 3 and 6) comprises a circular plate 80 which is located on the spindle flange 45 by means of a pair of diametrically arranged keys 81 and 82 which are fitted in a diametrically arranged keyway 83 (Fig. 2). The plate 80 is accurately located and centered relative to the face plate 45, after which it is located by dowel pins and is clamped in position thereon by screws 84 and 85. The chuck plate 80 is provided with a diametrically arranged dovetailed slideway 88 which is arranged substantially at right angles to the keys 81 and 82. The dovetailed slideway 88 is fixedly mounted on the plate 80. A transversely movable pot chuck slide 89 is provided with a dovetailed slideway mating with the dovetailed slide 88. Additional slideways and guideways 90 and 91 are arranged to engage slide surfaces 92 and 93 on the outer edges of the slide 89 (Fig. 2).

The pot chuck slide 89 is provided with work supporting plates 94 and 95 which are fixedly mounted thereon and are arranged to form a V-shaped work supporting surface to support a crank bearing 96 adjacent to the left-hand end of the crankshaft 43. A clamping strap 97 is pivotally mounted at one end on a stud 98. The other end of the clamping strap 97 is provided with a substantially U-shaped notch 99 which is engaged by a pivotally mounted clamping screw 100. The clamping screw 100 is pivotally supported on a stud 101 which is in turn fixedly mounted on the pot chuck slide 89. The clamping screw 100 is threaded at its upper end and is provided with a nut 102 by means of which the strap 97 may be clamped to hold the main bearing 96 rigidly in position on the V-shaped supporting surfaces 94 and 95.

In order to facilitate adjustment of the chuck to accommodate different sizes of bearings on crankshafts, it is desirable to provide an adjustable support for the pivot stud 98. In the preferred construction, the stud 98 is supported on the upper end of a screw 103 which is screw threaded into a portion of the pot chuck slide 89. The screw 103 is held in adjusted position by means of a lock nut 104. When it is desired to release the main bearing 96, the nut 102 is loosened and the clamping screw 100 swung in a counterclockwise direction after which the strap 97 may be swung in a clockwise direction into broken line position 97a.

If it is desired to adjust the position of the pivot stud 98 so as to vary the capacity of the chuck, the clamping strap 97 is swung to a vertical position in alignment with the axis of the screw 103, in which position the strap 97 may be turned in either direction to rotate the screw 103 so as to raise or lower the position of the pivot stud 98, after which the screw 103 may be locked in adjusted position by the lock nut 104.

In order to facilitate adjusting the pot chuck diametrically relative to the axis of the headstock spindle, a rotatable adjusting screw 105 is rotatably supported in a bearing 106 formed in an end cap 107 which is fixedly mounted on the end of the dovetailed slide member 88. A pair of collars 108 and 109 are arranged above and below the end cap 107 and are pinned to the screw 105 so as to hold the screw against endwise movement relative to the end cap 107. The screw 105 engages a threaded aperture 110 formed in the pot chuck slide 89. It will be readily apparent from the foregoing disclosure that the slide 89 may be readily adjusted in a diametrical direction relative to the axis of the headstock spindle by applying a wrench to a hexagonally shaped end 111 on the adjusting screw 105. The collar 108 is preferably graduated to facilitate precise adjustment of the position of the slide 89. After the slide 89 has been adjusted to the desired and predetermined position, the slideways or guides 90 and 91 may be clamped rigidly in position to lock the slide 89 into a fixed position relative to the pot chuck plate 80.

To facilitate adjusting the chuck and regrinding crankshafts having crankpins and main bearings of different diameters and throws, a pair of graduated scales are provided, as shown in Fig. 11. A "bearing diameter" scale 115 is fixedly mounted on the pot chuck slide 89. This slide is calibrated to read "inches bearing diameter" of the main bearing of the crankshaft to be ground. A "throw" scale 116 is fixedly mounted relative to the pot chuck plate 80. The scale 116 is calibrated to read "inches of throw" of the crankpins to be ground. The main bearing 96 of the crankshaft 43 is 2⅜" in diameter and the crankpin throw of the crankshaft is 2¼", consequently the position of pot chuck slide 89 is adjusted so that 2⅜" on the bearing diameter scale coincides with 2¼" on the throw scale, which serves precisely to locate the slide 89 with the bearing surfaces 94 and 95 in proper position to support the main bearing 96 for a grinding operation on a crankpin. After the slide 89 is thus adjusted, the slide may be clamped in adjusted position, as above indicated.

In order to locate the pot chuck in a vertical or loading position, a spring-pressed plunger or detent 118 is provided and arranged to engage a notch 119 formed in or fixedly mounted on the periphery of the pot chuck plate 80 (Fig. 2). The spring-pressed detent 118 is supported by a bracket 120 which is adjustably clamped to the table 21. The spring-pressed detent 118 is normally held in engagement with the notch 119 by means of a spring 121. An actuating knob 122 is provided by means of which the detent 118 may be withdrawn to an inoperative position and held in an inoperative position by means of a pin 123 after the knob 122 has been withdrawn toward the left (Fig. 2) and turned so that the pin 123 engages an end face on the bracket 120. An adjustably mounted counterbalance weight 125 is supported on the dovetailed slideway 88.

In supporting crank bearings of a relatively large diameter, the clamping strap or arm 97 may be inverted and positioned as shown in Fig. 10. In order to invert the strap 97, the strap is moved to a vertical position and turned 180° about the axis of the screw 103 as a pivot and then swung into the position shown in Fig. 10. It will be readily apparent, as previously described, that the position of the pivot stud 98 for the clamping strap 97 may be adjusted vertically by positioning the strap 97 in a vertical position and then rotating the same to adjust the screw 103 as desired.

A similar pot chuck is provided on the footstock 42 for supporting the right-hand end of the crankshaft 43, as shown in Fig. 1. This pot chuck (Figs. 7, 8 and 9) is substantially identical with the headstock pot chuck, consequently it will not be described in as much detail. The footstock pot chuck comprises a supporting plate 130 either fixed or adjustably mounted on the flange 72, which is provided with a diametrically arranged dovetailed slideway 131. A pot chuck slide 132 is provided having a dovetailed slideway which mates with the slideway 131. The slide 132 serves as a support for work supporting plates 133 and 134 which are arranged to form a V-shaped support for a cylindrical portion 135 formed at the right-hand end of the crankshaft 43. Side guides or slideway blocks 136 and 137 are provided to support the opposite sides of the slide 132. An adjusting screw 138 is rotatably supported by an end cap 139 which is mounted on one end of the dovetailed slide 131. The screw 138 is held against endwise movement by a pair of collars 140 and 141. The screw 138 is screw threaded into a threaded aperture 142 formed in the slide 132. It will be readily apparent that by applying a wrench to the hexagonally shaped end portion or head 143 of the screw 138, the screw may be readily rotated to adjust the position of the slide 132 in a diametrical direction. A clamping strap 144 is pivotally mounted at one end by a stud 145. The stud 145 is in turn supported by a screw 146 which is threaded into a portion of the slide 132 and is held in adjusted position relative thereto by means of a check nut 147. It will be readily apparent from the foregoing disclosure that the position of the pivot 145 for the strap 144 may be readily adjusted to accommodate various diameters formed on the right-hand end of a crankshaft.

The clamping strap 144 is provided with a substantially U-shaped notch 148 at its right-hand end (Fig. 8). A clamping screw 149 is pivotally supported by a stud 150 which is in turn fixedly supported relative to the pot chuck slide 132. When the clamping strap 144 is moved into an operative position (Fig. 8), the clamping screw 149 may be swung in a counterclockwise direction into the position illustrated in Fig. 8, after which a clamping nut 151 may be tightened to clamp the strap 144 to rigidly support the portion 135 of the crankshaft 43 in an operative position. An adjustably positioned counterbalance weight 152 is also provided which is supported on the dovetailed slideway 131.

In order to locate the pot chuck plate 130 in a vertical or loading position, a spring-pressed detent 155 is arranged to engage a notch 156 which is supported in fixed relationship with the pot chuck plate 130. The detent 155 is supported by a bracket 157 which is arranged to be adjustably clamped onto the upper surface of the table 21. A spring 158 normally tends to hold the detent 155 in engagement with the notch 156. An actuating knob 159 is provided whereby the detent may be manually withdrawn to an inoperative position when desired.

In order to time the chuck plate 130 with the chuck plate 80, it is desirable to provide a suitable adjustment whereby one of the pot chucks may be angularly adjusted relative to the other. As illustrated in the drawings, the notch 156 is preferably formed in a block 160 which is adjustably clamped in position on the chuck plate 130 by a pair of screws 161 and 162. The screws 161 and 162 pass through elongated slots formed in the block 160. A pair of opposed adjusting screws 163 and 164 are provided which are screw threaded into portions of the chuck plate 130 and engage the opposite end faces of the block 160. It will be readily apparent that by releasing the screws 161 and 162 and adjusting the screws 163 and 164, the chuck plate 130 may be readily adjusted relative to the chuck plate 80 as desired.

In order to facilitate precise adjustment of the pot chuck slide 132, graduations are provided on the collar 140 to facilitate adjustment of the screw 138. A "throw" scale 165 is mounted on or fixedly supported by the chuck plate 130. A "bearing diameter" scale 166 is fixedly supported on the slide 132 (Fig. 12). In accordance with the setting illustrated in Figs. 1, 8, 9 and 12, the portion 135 of the crankshaft 43 is 1¼" in diameter and the throw of the crankpins to be ground is 2¼", consequently the slide 132 is adjusted until 1¼" on the scale 166 is opposite 2¼" on the throw scale, in which position the V-shaped supporting members 133 and 134 will support the portion 135 at the right-hand end of the crankshaft 43 in a precise position to locate the main axis of the crankshaft in the desired offset relation with the axis of rotation thereof so that the axes of the crankpins 117 and 170 will coincide with the axis of rotation of the pot chucks 80 and 130.

In case it is desired to set the pot chucks to support the main bearings of the crankshaft 43 in alignment with the axis of rotation of the chucks, it is desirable to provide an adjustment whereby the pot chuck may be adjusted in a lateral direction, that is, normal to the direction of slide adjustment of the chuck for producing the desired throw. As illustrated in the modification shown in Figs. 23 and 24, the pot chuck plate 80 is provided with a slightly lateral adjustment relative to the face plate 45. A pivot stud 180 passes through the plate 80 and also through the face plate 45. A pair of clamping bolts 181 and 182 pass through closely fitting holes in the pot chuck plate 80 and then through clearance holes 183 and 184, respectively, in the face plate 45. It will be readily apparent from the foregoing disclosure that the pot chuck plate 80 may be swung in a lateral direction about the axis of the bolt or stud 180 as a pivot. The extent of lateral adjustment is limited by the clearance provided in the holes 183 and 184. To facilitate a precise lateral adjustment of the plate 180, a stud 185 is fixedly mounted in the pot chuck plate 80 and extends through a notch 186 provided in the face plate 45. A pair of opposed adjusting screws 187 and 188 are screw threaded into portions 189 and 190 of the face plate 45. The ends of the screws 187 and 188 are arranged to engage the stud 185 on diametrically opposite sides. If a lateral adjustment of the pot chuck is desired, the clamping bolts 181 and 182 may be loosened and by manipulation of the adjusting screws 187 and 188, the pot chuck plate 80 may be swung through a limited distance either in a clockwise or counterclockwise direction (Fig. 23), after which the pot chuck plate 80 may be clamped rigidly to the face plate 45 by means of the clamping bolts 180, 181 and 182. A similar lateral adjustment may also be provided for the pot chuck plate 130, to facilitate adjusting the plate 130 laterally relative to the flange 72.

In grinding a crankshaft such as that shown in Fig. 1, it is desirable to provide suitable steadyrests for steadying the crankpins to be ground. In the preferred construction, two steadyrests are employed, one positioned to steady and support the crankpin 117 and the other to steady and support the crankpin 170 (only one steadyrest being illustrated in the drawings). A steadyrest frame 200 is provided with suitable clamping means for removably clamping the steadyrest frame to the upper surface of the table 21. The steadyrest frame 200 supports a horizontally adjustable slide 201 which in turn supports a steadyrest shoe 202. A rotatable adjusting screw 203 is provided for transversely adjusting the slide 201 of the steadyrest shoe 202 relative to the steadyrest frame 200. The screw 203 is screw threaded into a threaded aperture 204 formed within the slide 201. A manually operable hand wheel 205 is provided for adjusting the screw and thereby adjusting the position of the steadyrest shoe 202. A second or lower steadyrest shoe 206 is arranged to engage the work piece at a point below the work axis and at a point adjacent to the line of contact between the wheel and the work piece to be ground. The shoe 206 is supported by an arm 207 which is pivotally supported by a stud 208. A downwardly extending arm 209 is formed integral with the arm 207 so that the arms 207 and 209 form a bell crank lever. A rotatable adjusting screw 210 is screw threaded through a threaded aperture 211 formed in the steadyrest frame 200. The lower end of the screw 210 engages a portion of the arm 209. A manually operable adjusting knob 212 is adjustably mounted on the outer end of the screw 210 and serves to facilitate adjustment of the steadyrest shoe 206.

It is desirable to provide a suitable crankpin aligning device so that after the pot chucks have been adjusted vertically for crank throw, crankpins may be indexed and positioned so that their axes coincide with the axis of rotation of the pot chucks for a grinding operation. In the preferred embodiment of this feature, the horizontally movable steadyrest shoe 202 is utilized to locate the crankpin to be ground in a predetermined grinding position. The steadyrest shoe 202 is provided with a crankpin bearing shoe 215 which is preferably of a hard non-wearable material, such as, for example, a hard cemented carbide. A scale 216 is mounted on the side face of the steadyrest frame 200 (Figs. 13 and 19). The scale 216 is calibrated in "inches diameter" of the crankpin. An index pointer or zero datum 217 is fixedly mounted on the slide 201 and extends through an elongated slot 218 in the side face of the steadyrest. The index pointer 217 is preferably located adjacent to the graduated edge of the scale 216. The crankpin 117 to be ground is 2" in diameter. Therefore, after the crankshaft 43 is positioned in the pot chucks 89 and 132, the adjusting knob 205 on the steadyrest 200 is rotated until the index pointer 217 is opposite the 2" diameter graduation on the scale 216 (see Fig. 19). The crankshaft 43 is then rotated manually until the crankpin 117 bears against the shoe 215 after which the crankshaft is clamped in position in the pot chucks 89 and 132.

In order to check the concentricity of the crankpin 117 to determine whether or not it is adjusted absolutely concentric with the axis of rotation of the pot chucks, a visible indicating mechanism is provided which not only serves to check the concentricity of the crank pin before grinding but also serves visibly to indicate work size as the grinding operation proceeds. This mechanism may comprise a bracket 220 which is fixedly mounted on the upper surface of the steadyrest 200. The bracket 220 serves as a support for a cylindrically shaped slide member 221 which is slidably keyed within a cylindrical aperture 222 within the bracket 220 by means of a key 223. The cylindrically shaped slide member 221 contains a slidably mounted spindle or plunger 224 the right-hand end of which (Fig. 13) bears against an actuating plunger 225 of a dial indicator 226 which is mounted within a protective housing 227. The housing 227 is fixedly mounted adjacent to the end of the cylindrically shaped slide 221 and is provided with a hinged cover 228 by means of which the dial indicator may be protected and covered when not in use. A clamping screw 229 is provided for locking the cylindrically shaped slide member in the desired and predetermined relationship with the bracket 220. The plunger 224 is normally urged in a direction toward the left (Fig. 13) by means of a compression spring 230. A pivotally mounted lever 231 is pivotally supported on a stud 232 and is provided with a work engaging tip 233. An arm 234 is fixedly mounted relative to or formed integrally with the lever 231. The upper end of the arm 234 is provided with a rounded end 235 which fits within an elongated slot 236 formed in the slide 221 (Figs. 13, 14 and 15).

In order to provide only a limited movement of the spindle 224 relative to the slide 221, an adjusting screw 238 is screw threaded into an end plate or plug 239 fixed in the end of the cylindrically shaped slide 221 (Fig. 15). The screw 238 is provided with an enlarged head 240 which engages a T-shaped slot 241 which is formed in the end of the spindle 224. It should be noted that the T-shaped slot is provided with sufficient clearance relative to the head 240 of the screw 238 so as to allow a limited movement of the spindle 224 relative to the cylindrically shaped slide 221.

During a loading operation, the cylindrically shaped slide 221 is moved toward the right (Fig. 13) into an inoperative position so as to swing the arm 231 and the contact tip 233 in a clockwise direction into an inoperative position out of engagement with the work surface. After the crankshaft 42 has been positioned in the pot chucks 89 and 132 and the crankpin 117 rotated into engagement with the crankpin aligning surface 215, the pot chucks are clamped to lock the crankshaft 43 in an operating position. Before the grinding operation is started, the clamping screw 229 is loosened and the cylindrically shaped slide 221 is moved toward the left to swing the arm 231 and the work engaging contact member 233 in a counterclockwise direction into engagement with the work surface into the position shown in Fig. 13. The pot chucks may then be rotated manually so that the operator may observe by means of the dial indicator whether or not the periphery of the crankpin 117 is concentric relative to the axis of rotation of the pot chucks. If the operator finds by such test that the crankpin is slightly out of true indexed position, that is, in a horizontal plane (Fig. 13), the pot chucks are stopped in the vertical positions shown in Figs. 2 and 8, the pot chuck clamping straps are released, and the adjusting knob 205 is turned precisely to compensate for any out-of-line condition of the crankpin 117 in a horizontal plane. The periphery of the hub portion of the adjusting knob 205 is preferably calibrated in thousandths of an inch diameter of the pin so that suitable compensation may be made to align the crankpin. After this compensation has been completed, the crankpin 117 is again rotated relative to the pot chucks into alignment with the shoe 215, after which it may be clamped in adjusted position within the pot chucks 89 and 132.

If in testing concentricity of the crankpin, it is found that a vertical adjustment of the pin is necessary so that its periphery will run concentric, the pot chucks 89 and 132 may be vertically adjusted either up or down so that the periphery of the crankpin 117 will be absolutely concentric with its axis of rotation.

In order to prevent forcing the cylindrically shaped slide 221 rapidly into an operating position with the work contact member 233 in engagement with the work and to prevent damaging the dial indicator 226, a suitable stop mechanism is provided comprising an adjustably mounted stop screw 245 which is screw threaded into a dovetailed slide 246 which is supported by a correspondingly shaped slideway formed in the side face of the bracket 220. The slide 246 may be clamped in fixed position relative to the bracket 220 by means of a clamping screw 247. The slide 246 is preferably provided with a scale 248 calibrated in "inches diameter" of the crankpin which is arranged adjacent to an index line 249 formed on the bracket 220. When the cylindrically shaped slide 221 is moved into an operative position, the movement of the slide toward the left (Fig. 13) continues until the casing 227 which surrounds the dial indicator engages the end of the stop screw 245. As previously stated, the crankpin 117 is 2" in diameter before the grinding operation, consequently the slide 246 is adjusted so that the 2" diameter reading on the scale 248 coincides with the index pointer 249. In this position of the stop screw 245, when it is desired to move the gauging apparatus to an operative position, the screw 229 may be loosened and the cylindrically shaped slide 221 may be moved toward an operative position, this movement being limited by engagement of the casing 227 with the end of the stop screw 245.

After the work piece has been adjusted for concentricity, if desired the work engaging point 233 may be left in engagement with the periphery of the crankpin 117 so that the operator may read the reduction in size of the crankpin 117 as the grinding operation proceeds.

The operation of this improved crankshaft regrinding machine will be readily apparent from the foregoing disclosure. The opposite ends of a crankshaft 43 to be ground or reground are measured, that is, the end main bearing surfaces thereof are measured, and the pot chucks are adjusted to position the pot chucks for supporting the end main bearings of the shaft in the proper position to grind crankpins of a predetermined throw. The pot chucks are adjusted as previously described until the bearing diameter on the scales coincides with the throw indicated on the throw scales, after which the crankshaft to be ground is placed in position within the chucks. If necessary, the headstock or footstock may be adjusted lengthwise relative to the table 21 to adjust the pot chucks lengthwise of the machine relative to the crankshaft. The clamping mechanisms for the headstock and footstock are common, well known expedients which have been used in the grinding industry for many years. The crankpin to be ground is then measured and a steadyrest 200 positioned on the table with its shoes in an operative position relative to the crankpin 117. The horizontally movable steadyrest shoe 215 is adjusted so that the index pointer 217 coincides with the crankpin diameter on the scale 216, after which the crankshaft may be locked in an operative position in the pot chucks 89 and 132. The pot chucks are then preferably rotated manually to test for concentricity of the crankpin 117. After suitable compensation has been made, if necessary, the crankshaft is locked in position on the pot chucks for a grinding operation. The common type crankshaft, such as illustrated in the drawings, usually has two crankpins which are positioned in axial alignment with each other. In grinding such a shaft, two steadyrests are preferably employed, each of which is a duplicate of that shown in Figs. 13 and 14. One of these steadyrests would be positioned in operative position relative to the crankpin 117 and the other in operative position relative to the crankpin 170. By utilizing the aligning and gauging devices previously described, both of the pot chucks 89 and 132 may be precisely adjusted relative to the two crankpins which are to be ground while the shaft is in the same operating position. The grinding operation may then proceed with the gauge in an operative position, as illustrated in Fig. 13, and the crankpin 117 may be ground to the desired and predetermined extent.

After the crankpin 117 has been ground, the grinding wheel 35 may be moved rearwardly to an inoperative position and the work table 21 traversed toward the left by manual rotation of the traverse wheel 25 so as to position the crankpin 170 in an operative position relative to the grinding wheel 35. After both of the crankpins 117 and 170 have been ground, the steadyrests may then be positioned opposite the crankpins 270 and 271 and the crankshaft may then be released within the pot chucks 89 and 132 so that the crankshaft 43 may be rotated into an indexed position so that crankpins 270 and 271 will have their axes coinciding with the axis of rotation of the pot chucks. The aligning of the crankpins 270 and 271 may be accomplished in the manner above described in connection with crankpins 117 and 170, after which the pins may be ground to the desired and predetermined extent.

It will thus be seen that there has been provided by this invention apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. In a crankshaft grinding machine having a rotatable spindle, a face plate thereon, a pot chuck for supporting a crankshaft to be ground, a slide interposed between said pot chuck and said face plate to facilitate adjustment of said pot chuck, means to adjust said pot chuck so that the axis of a crankshaft supported thereby moves in a plane normal to the spindle axis, and means to adjust the position of said slide relative to said face plate so that the path of adjustment of the axis of a crankshaft supported by said chuck to determine crank throw passes through the axis of said spindle.

2. In a crankshaft grinding machine, a rotatable spindle having a face plate fixedly mounted thereon, a plate having a slideway thereon which is adjustably mounted on said face plate, a pot chuck for supporting a crankshaft to be ground, a mating slideway on said pot chuck, said slideways being arranged to adjust said pot chuck so that the axis of a crankshaft supported thereby moves in a plane normal to said spindle axis, and means to adjust the position of said plate and slide relative to said face plate so that the path of adjustment of the axis of a crankshaft supported by said chuck lies in a plane which coincides with the axis of said spindle.

3. In a crankshaft grinding machine having a pair of spaced aligned rotatable work spindles, a crankshaft supporting pot chuck on each of said spindles, means precisely to adjust each of said chucks in a path normal to the axis of said spindles to facilitate grinding crankpins having a predetermined throw, and means laterally to adjust each of said chucks bodily in a direction substantially at right angles to said first adjustment so that the path of adjustment of the axis of the crankshaft supported by said chucks to determine crank throw passes through the axes of said spindles.

4. In a crankshaft grinding machine having a pair of spaced aligned rotatable spindles, a face plate fixedly supported on adjacent ends of each of said spindles, an independent pot chuck having a plate adjustably supported on each of said face plates, each of said pot chucks having a diametrically adjustable slide on said latter plate, a V-shaped crankshaft support on each of said slides, means including a pivotally mounted jaw on each of said slides to facilitate clamping the opposite end of a crankshaft on said V-shaped support, means precisely to adjust each of said pot chuck slides in a path normal to the axes of said spindles to facilitate grinding crankpins having a predetermined throw, and independent means laterally to adjust each of said pot chuck plates relative to said face plates bodily in a direction substantially at right angles to the movement of said slides so that the path of adjustment of the axis of the crankshaft supported by said chucks to determine crank throw passes through the axes of said spindles.

5. In a crankshaft grinding machine having a rotatable spindle, a face plate fixedly supported thereon, a pot chuck including a crankshaft supporting and locating surface, and a pivotally mounted clamping jaw associated therewith to clamp a crankshaft thereon, and an adjustable fulcrum stud for said jaw whereby the position of said jaw may be adjusted relative to said supporting surface to accommodate crankshafts of different diameters.

6. In a crankshaft grinding machine having a rotatable spindle, a face plate fixedly supported thereon, a pot chuck including a V-shaped support and a pivotally mounted clamping strap associated therewith to clamp a crankshaft thereon, and an adjustable fulcrum stud for said strap whereby the position of said strap may be varied relative to said V-shaped supporting surface to accommodate crankshafts of different diameters.

7. In a crankshaft grinding machine having a rotatable spindle, a face plate fixedly supported thereon, a pot chuck including a crankshaft supporting and locating surface and a pivotally mounted clamping jaw associated therewith to clamp a crankshaft thereon, an adjustable fulcrum stud for supporting one end of said jaw whereby the position of said jaw may be adjusted relative to said supporting surface to accommodate crankshafts of different diameters, a clamping screw on said chuck to clamp the other end of said jaw, said jaw being arranged so that it may be readily inverted to facilitate supporting a crankshaft having a main bearing of relatively large diameter.

8. In a crankshaft grinding machine having a rotatable spindle, a face plate fixedly mounted thereon, a pot chuck adjustably supported on said plate including a V-shaped crankshaft support and a pivotally mounted clamping strap to clamp a crankshaft therein, an adjustable fulcrum stud for one end of said strap whereby the position of said strap may be varied relative to said support to accommodate crankshafts of different diameters, a clamping screw on said chuck to clamp the other end of said strap, means including a nut and screw precisely to adjust said pot chuck in a path normal to the spindle axis, and means laterally to adjust said chuck bodily relative to the face plate so that the path of adjustment of the axis of the crankshaft supported by said chuck passes through the axis of said spindle.

9. In a crankshaft grinding machine having a rotatable spindle, a face plate fixedly supported thereon, a pot chuck having a plate adjustably mounted on said face plate, said pot chuck having a diametrically adjustable slide on said latter plate, a crankshaft support on said slide, means including a pivotally mounted clamping jaw on said slide to facilitate clamping a crankshaft on said support, and precise means to adjust said slide to facilitate supporting a crankshaft having a predetermined bearing diameter and crank throw, said means including a graduated scale on said slide calibrated in inches-diameter-main-bearing, and a second scale on said chuck plate calibrated in inches-crankpin-throw to facilitate adjustment of the chuck for grinding a crankpin on a crankshaft having a predetermined throw.

10. In a crankshaft grinding machine having a pair of spaced aligned rotatable work spindles, a crankshaft supporting pot chuck on each of said spindles, means precisely to adjust said pot chucks laterally relative to said spindles including a scale on each of said chucks calibrated in inches-diameter-main-bearing and a second scale fixed relative to each of said spindles calibrated in inches-crankpin-throw to facilitate setting up said chucks for supporting a crankshaft having crankpins of predetermined throws, a crankshaft aligning mechanism including a frame, a horizontally adjustable shoe thereon, and precise means including a graduated scale calibrated in inches-crankpin-diameter on said frame and a zero datum on said shoe to facilitate precise location of said shoe for aligning a crankpin of a predetermined diameter so that its axis coincides with the axis of said spindles.

11. In a crankshaft grinding machine as claimed in claim 2, the combination with the parts and features therein specified, of an adjusting means between said face plate and said pot chuck plate including a fixed pivot stud extending through both of said plates, a fixed stud on the said chuck plate located diametrically opposite thereto, said latter stud extending through a clearance aperture in said face plate, and a pair of aligned spaced adjusting screws on said face plate which are arranged to engage opposite faces of said fixed stud to facilitate a lateral adjustment of said chuck plate relative to said face plate, said lateral adjustment being at substantially right angles to the pot chuck slide.

12. In a crankshaft grinding machine as claimed in claim 2, the combination with the parts and features therein specified, of an adjusting means between said face plate and said pot chuck plate including a fixed pivot stud extending through both of said plates, a fixed stud on the said chuck plate located diametrically opposite thereto, said latter stud extending through a clearance aperture in said face plate having a pair of aligned spaced adjusting screws on said face plate which are arranged to engage opposite faces of said fixed stud to facilitate a lateral adjustment of said chuck plate relative to said face plate so that the path of adjustment of the axis of a crankshaft supported in said pot chuck intersects the axis of said spindle.

13. In a crankshaft grinding machine as claimed in claim 2, the combination with the parts and features therein specified, of an adjusting means between said face plate and said pot chuck plate including a fixed pivot stud extending through both of said plates, a fixed stud on said chuck plate located diametrically opposite thereto, said latter stud extending through a clearance aperture in said face plate having a pair of aligned spaced adjusting screws on said face plate which are arranged to engage opposite faces of said fixed stud to facilitate a lateral adjustment of said chuck plate relative to said face plate so that the path of adjustment of the axis of the crankshaft supported in said pot chuck lies in a plane containing the axis of said spindle.

14. In a crankshaft grinding machine having a pair of spaced aligned rotatable work spindles, a crankshaft supporting pot chuck on each of said spindles, means to adjust said pot chucks laterally relative to said spindles to facilitate setting up said chucks for supporting a crankshaft for grinding crankpins having predetermined throws, a crankshaft aligning mechanism including an adjustable shoe, precise means for adjusting said shoe to locate said shoe for aligning a crankpin of predetermined diameter so that its axis coincides with the axis of said spindles, a visible indicating mechanism including a dial indicator whereby the concentricity of a crankpin may be readily determined, a slidable mount for said indicator whereby it may be readily moved to and from an operative position, a work contacting member, and means including a lever connecting said member with said dial indicator, and precision means for moving said indicator precisely to a predetermined operating positon corresponding with the diameter of the crankpin to be ground.

ALBERT G. BELDEN.
CARL G. FLYGARE.
OIVA E. HILL.